(12) United States Patent
Jones et al.

(10) Patent No.: US 8,593,330 B2
(45) Date of Patent: Nov. 26, 2013

(54) MULTICHANNEL, MULTIMODE, MULTIFUNCTION L-BAND RADIO TRANSCEIVER

(75) Inventors: James B. Jones, Carnation, WA (US); Pal Meiyappan, Bellevue, WA (US); Paul Ferguson, Redmond, WA (US); Mark Virtue, Kirkland, WA (US); Thomas W. Hastings, Woodinville, WA (US)

(73) Assignee: Honeywell International Inc., Morristown, NJ (US)

( * ) Notice: Subject to any disclaimer, the term of this patent is extended or adjusted under 35 U.S.C. 154(b) by 181 days.

(21) Appl. No.: 13/180,425

(22) Filed: Jul. 11, 2011

(65) Prior Publication Data

US 2013/0015998 A1 Jan. 17, 2013

(51) Int. Cl.
*G01S 13/74* (2006.01)

(52) U.S. Cl.
USPC .................................. 342/30; 342/36; 342/47

(58) Field of Classification Search
USPC ............................................. 342/29–40, 47
See application file for complete search history.

(56) References Cited

U.S. PATENT DOCUMENTS

| | | | |
|---|---|---|---|
| 6,387,482 B1 | 5/2002 | Persiani et al. | |
| 7,439,901 B2 * | 10/2008 | Needham et al. | 342/30 |
| 8,063,816 B2 * | 11/2011 | Troxel | 342/30 |
| 2005/0156777 A1 * | 7/2005 | King et al. | 342/29 |
| 2007/0200741 A1 | 8/2007 | Hunter | |
| 2008/0054507 A1 | 3/2008 | Rudmann et al. | |
| 2008/0068250 A1 * | 3/2008 | Brandao et al. | 342/30 |
| 2008/0174472 A1 | 7/2008 | Stone et al. | |
| 2008/0174473 A1 | 7/2008 | Smith et al. | |
| 2008/0266166 A1 * | 10/2008 | Schuchman | 342/37 |
| 2009/0027254 A1 * | 1/2009 | Troxel | 342/30 |
| 2009/0322587 A1 * | 12/2009 | Stayton | 342/37 |
| 2010/0181590 A1 | 7/2010 | Chen | |
| 2010/0292871 A1 * | 11/2010 | Schultz et al. | 701/3 |
| 2010/0315282 A1 * | 12/2010 | Stayton | 342/40 |
| 2011/0001653 A1 * | 1/2011 | Troxel | 342/30 |
| 2011/0017441 A1 | 1/2011 | Shin et al. | |
| 2012/0001788 A1 * | 1/2012 | Carlson et al. | 342/30 |
| 2012/0146833 A1 * | 6/2012 | Pawlitzki | 342/37 |
| 2013/0015998 A1 * | 1/2013 | Jones et al. | 342/30 |

OTHER PUBLICATIONS

Kandasamy, et al., Transient cooling of electronics using phase change material (PCM)-based heat sinks, ScienceDirect, Applied Thermal Engineering 28 (2008) 1047-1057. Received Dec. 23, 2006; accepted Jun. 19, 2007; Available online Jun. 24, 2007.

(Continued)

*Primary Examiner* — John B Sotomayor
(74) *Attorney, Agent, or Firm* — Shumaker & Sieffert, P.A.

(57) ABSTRACT

Systems and methods for providing an improved multiradio system. An exemplary system includes first and second antennas and a first receiver that receives a signal from the first antenna, filters the received signal based on bandwidths associated with a traffic collision-avoidance system (TCAS), a transponder, and a universal access transceiver (UAT). The system digitizes the filtered signal and digitally downconverts the digitized signal. A second receiver receives a signal from the second antenna, filters the signal received from the second antenna based on the TCAS, the transponder, the UAT, and distance-measuring equipment (DME), separates the filtered signal into a first signal having a bandwidth associated with the TCAS, the transponder, the UAT and the lower half of the DME RF band, and into a second signal having a bandwidth associated with the upper half of the DME RF band, digitizes the first and second signal, and digitally downconverts the digitized first and second signals.

9 Claims, 6 Drawing Sheets

(56) References Cited

OTHER PUBLICATIONS

Laird Technologies, Thermal Interface Solutions, www.lairdtech.com, THR-BRO-Therminterface-SOL 1009; © Copyright 2009 Laird Technologies, Inc.

Leo G. Maloratsky, RF Design of Avionics L-band Integrated Systems, Microwave Journal, Aerospace Electronics Co., Indiatlantic, FL, vol. 52, No. 10, Oct. 2009, p. 64 http://www.mwjournal.com/Article/RF_Design_Avionics_band_Integrated_Systems/AR_8234/.

* cited by examiner

MULTICHANNEL, MULTIMODE, MULTIFUNCTION L-BAND RADIO TRANSCEIVER

BACKGROUND OF THE INVENTION

Currently, up to four radio systems are required to implement traffic collision avoidance system (TCAS), air traffic control (ATC) transponder, distance-measuring equipment (DME), and universal access transceiver (UAT) avionics functions on an aircraft. This would require four different transceivers. This implementation is not optimal in terms of weight, cost, volume, and power consumption.

Some systems have attempted to resolve this problem. In one current embodiment of an L-band receiver system, a DME receiver is included along with a receiver for the TCAS, transponder, and UAT. This prior-art design still includes all the analog circuitry for generating three separate narrowband signals for the TCAS, transponder, and UAT intermediate frequency (IF) outputs. The DME IF output is separately generated.

SUMMARY OF THE INVENTION

The present invention combines transmit and receive functions of all four radios (traffic collision advisory system (TCAS), air traffic control (ATC) transponder, distance-measuring equipment (DME), and universal access transceiver (UAT)) into a single radio. This reduces the number of transmitters from four to one. This also reduces the number of receivers, power supplies, and digital modules from four to one. This reduces weight, cost, volume, and power consumption.

BRIEF DESCRIPTION OF THE DRAWINGS

Preferred and alternative embodiments of the present invention are described in detail below, with reference to the following drawings:

FIGS. 3, 4-1, 4-2 and 4-3 illustrate components of an exemplary system formed in accordance with an embodiment of the present invention.

DETAILED DESCRIPTION OF THE INVENTION

The invention incorporates a wideband receiver capable of receiving multiple signals within the frequency range of 962 MHz to 1213 MHz. It simultaneously decodes four different formats—traffic collision-avoidance system (TCAS), at 1090 MHz, air traffic control (ATC) transponder at 1030 MHz, universal access transceiver (UAT) at 978 MHz, and distance-measuring equipment (DME) in 1-MHz channels within a 962 MHz to 1213 MHz DME band.

This invention also incorporates a wideband transmitter capable of transmitting multiple signal formats. That is: TCAS at 1030 MHz, ATC transponder at 1090 MHz, and DME in 1-MHz channels within 1025 MHz to 1150 MHz.

Limitations of analog-to-digital conversion (ADC) over wide bandwidth, while simultaneously meeting required signal-to-noise ratio, prevented a direct conversion (sampling at LB and frequency directly) realization of wideband multichannel radio as an integrated solution. This invention uses a subbanding technique and block-down conversion to cover the entire L-band avionics radio spectrum, thereby making wideband ADC practical. Another practical limitation of wideband radio is the linearity at high input signal levels of the analog front end. This limitation is overcome by limiting the gain of the analog front end and judicious implementation of the block downconversion to place the harmonics of down converted signals outside of the sampled and digitally filtered bandwidth. The transmitter covers multiple L-band functions by using either a single multimode modulator or switchable mode-specific modulators. The entire L-band frequency spectrum is amplified using wideband power amplifiers. Higher power level and efficiency for the DME function are achieved by using mode-select information and adaptively changing power amplifier bias.

Traditionally a first Nyquist sample region is used in A to D conversion. For example, when a sampling clock frequency of $F_c$ (example 320 MHz) is used for the ADC, the analog frequency to be digitized is selected to be less than ½ the sampling clock frequency (160 MHz). If this method is employed in wideband radio, harmonics of received down converted signals produce interference for other desired channels.

For example, to block down convert 962 MHz to 1100 MHz to the first Nyquist zone using $F_c$ of 320 MHz, LO frequency of 1112 MHz could be used. This block down conversion produces signals from 12 MHz to 150 MHz. However when the receiver receives a strong TCAS signal at 1090 MHZ, this is down converted to 22 MHz and this strong signal generates harmonics at 44 MHz, 66 MHz . . . . If there is a weak DME signal is present at 1068 MHz this will be down converted to 44 MHz using the same LO at 1112 MHz. Because of the harmonics generated by TCAS reception, the DME channel will be polluted rendering the wideband radio inoperable.

However, if LO frequency is chosen such that the block down converted signal's harmonics are placed outside the A to D sampling bandwidth using second Nyquist region, this problem is avoided. For example if LO frequency is chosen to be 1265 MHz, then the TCAS signal at 1090 will be down converted to 175 MHz. Harmonics of this fall outside the maximum frequency for any channel used in this wideband radio implementation.

Figure 1:
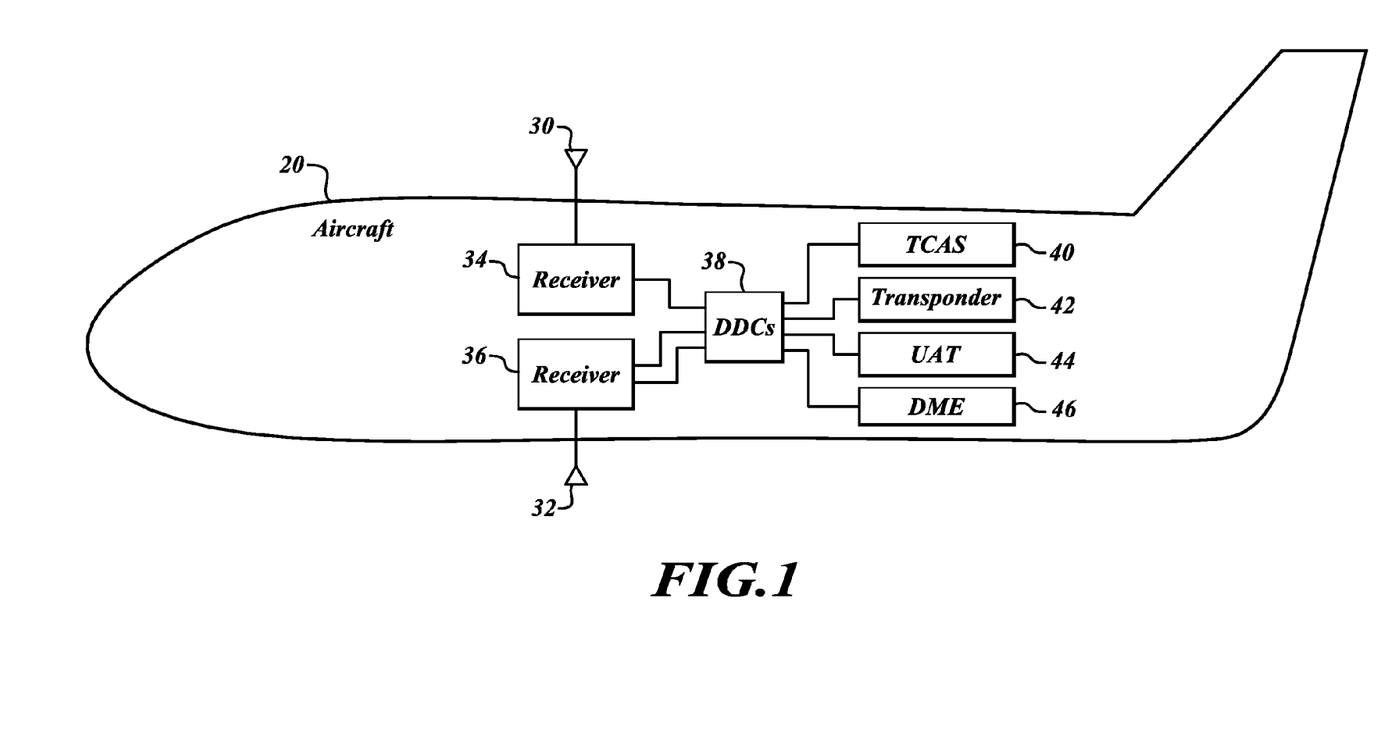
FIG. 1 illustrates a schematic view of components included in an aircraft in accordance with an embodiment of the present invention.
Figure 3:
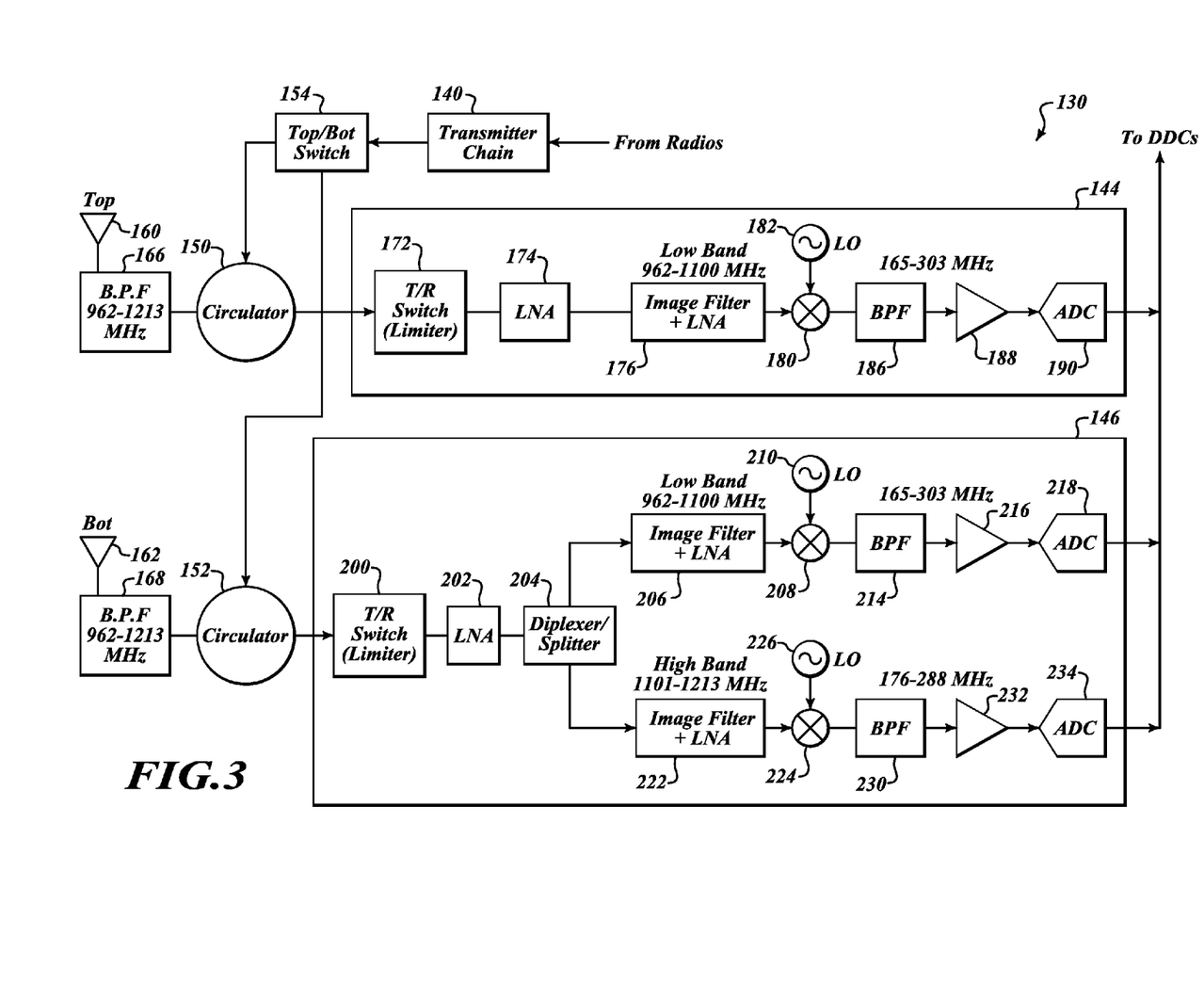

FIG. 1 illustrates an aircraft 20 that includes a multichannel, multimode, multifunction L-band radio transceiver system. The transceiver system includes top and bottom antennas 30, 32 that are in signal communication with respective receivers 34, 36 and transmitters (not shown). The receivers 34, 36 block downconvert the radio frequency (RF) signals received by the antennas 30, 32, digitize the resulting wideband intermediate frequency (IF) spectrum with a high speed ADC, and sends the digital signals to digital down converters (DDCs) 38. The DDCs 38 apply digital signal processing, including but not limited to filtering and decimation, to the multichannel digital signals which convert them into single function data streams that are then sent to the four radio signal processors: a TCAS 40, a transponder (XPDR) 42, a UAT 44, and a DME 46. Exemplary contents of the receivers 34, 36 are shown in FIG. 3.

Figure 2:
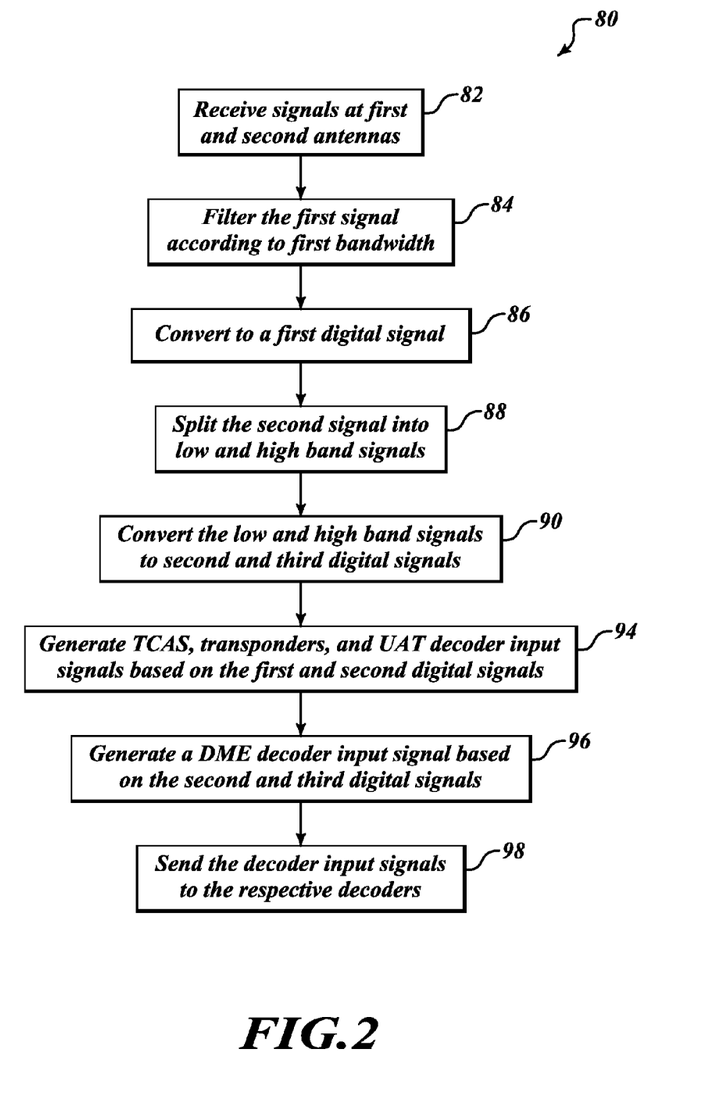
FIG. 2 is a flowchart of an exemplary process performed by the system components shown in FIG. 1.

FIG. 2 illustrates an exemplary process 80 performed by the transceiver system shown in FIG. 1. First, at a block 82, the top and bottom antennas 30, 32 receive first and second radio signals. Next, at a block 84, the first received signal is filtered according to a first bandwidth that is associated with the TCAS 40, the transponder 42, and the UAT 44. At a block 86, the filtered first signal is converted to a first digital signal. At a block 88, the second received signal is filtered and split into low and high band signals. The low band signal is associated with the TCAS 40, the transponder 42, and the UAT 44 and the lower half of the DME RF band. The high band signal is associated with the upper half of the DME 46 RF band. At block 90, the low and high band signals are converted to second and third digital signals. The steps performed at blocks 88 and 90 may be performed concurrently with the steps performed at blocks 84 and 86. Next, at a block 94, the TCAS, transponder, and UAT decoder input signals are generated, based on the first and second digital signals. At a block 96, a DME decoder input signal is generated, based on the second and third digital signals. Finally, at a block 98, the generated decoder input signals are sent to the respective decoders (the TCAS 40, the transponder 42, the UAT 44, and the DME 46).

Figure 41:
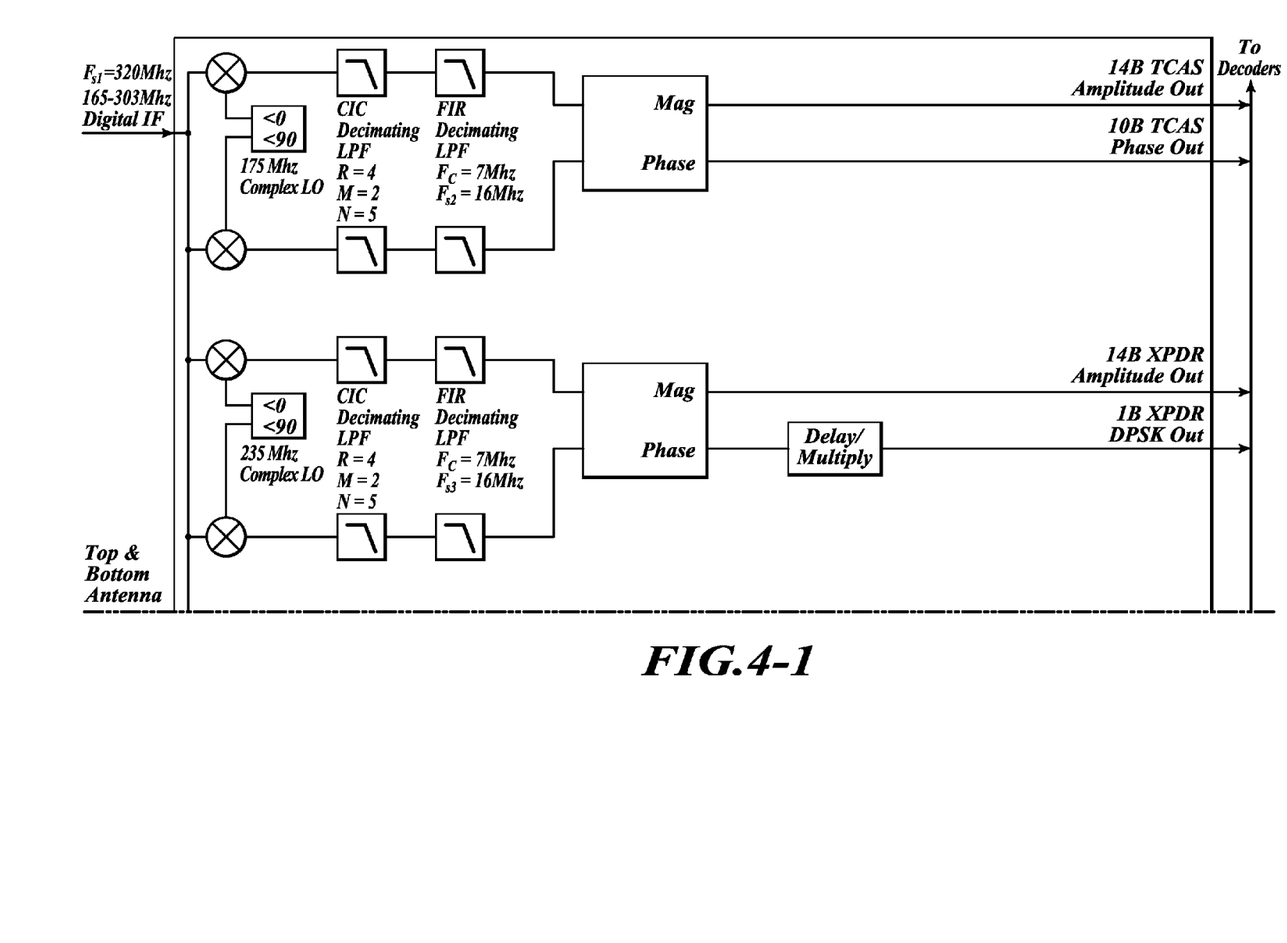
Figure 42:
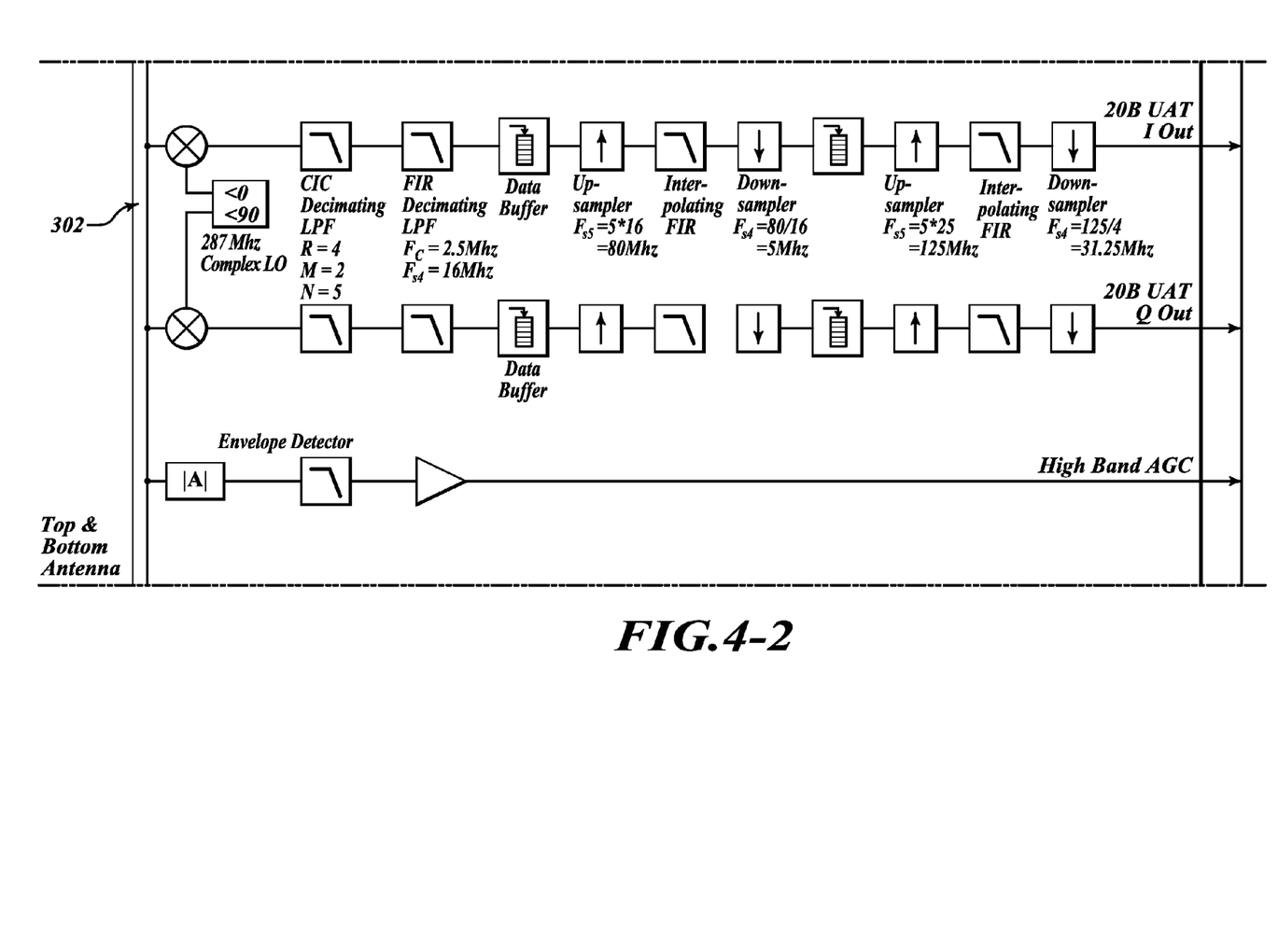
Figure 43:
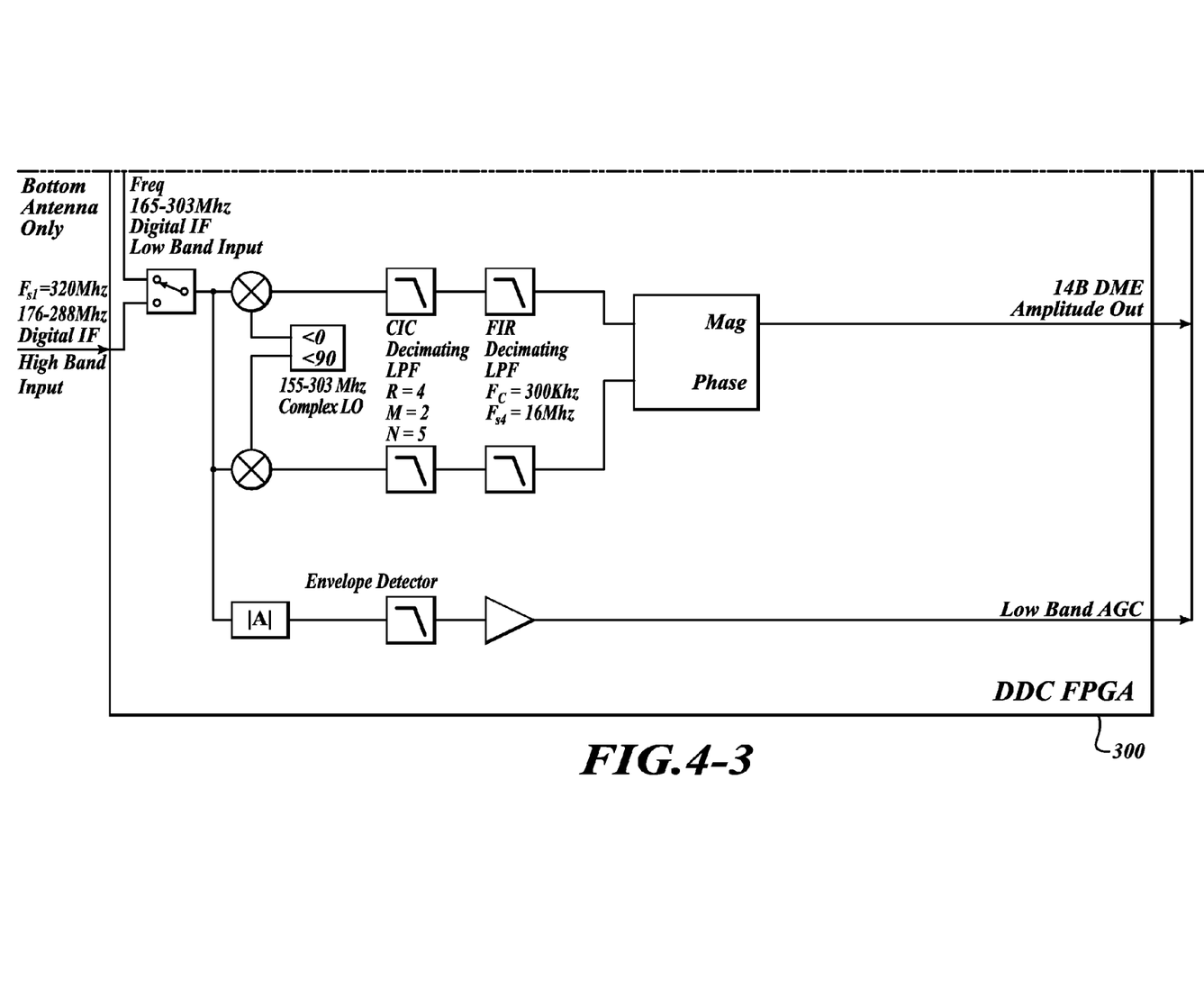

FIGS. 3, 4-1 and 4-2 illustrate analog and digital components of the receiver portion of an exemplary transceiver system 130. The transceiver system 130 includes top and bottom antennas 160, 162, first and second bandpass filters (BPF) 166, 168, first and second circulators 150, 152, a transmit/receive switch 154, a transmitter 140, a top antenna analog receiver component 144, a bottom antenna analog receiver component 146, and a plurality of digital downconverters (DDC) 300.

The first BPF 166 is in signal communication with the top antenna 160 and the first circulator 150. The first circulator 150 is also in signal communication with the transmitter switch 154 and the top antenna's analog receiver component 144. The second BPF 168 is in signal communication with the bottom antenna 162 and the second circulator 152. The circulator 152 is in signal communication with the transmitter switch 154 and the bottom antenna's analog receiver component 146. In this embodiment, the BPFs 166, 168 filter signals in the 962 to 1213 MHz bandwidth. The bandwidth that is filtered by the BPFs 166, 168 encompasses only those radio signals associated with the TCAS 40, transponder 42, the UAT 44, and the DME 46. The circulators 150, 152 provide signal directionality such that signals generated by the transmitter 140 are passed to the respective antennas 160, 162 and signals received by the respective antennas 160, 162 are passed to the respective receiver components 144, 146.

The top receiver component 144 includes a T/R switch (limiter) 172 that receives the bandwidth-limited signal from the first circulator 150. A first low-noise amplifier (LNA) 174 receives the output of the T/R switch (limiter) 172 to produce a first amplified signal. The T/R switch (limiter) 172 prevents overdriving the LNA 174 when high power signals are present at the antennas, including the transmitter output. An image-filtering and second LNA component 176 receives the output of the first LNA 174 to produce a radio frequency (RF) signal with a bandwidth of 962 to 1100 MHz. At a mixer 180, the output of the image-filtering and second LNA component 176 is combined with a local oscillator (LO) signal 182. A BPF 186 and an amplifier 188 receive the output of the mixer 180 to produce an intermediate frequency (IF) with a bandwidth of 165 to 303 MHz. The signal outputted by the amplifier 188 is then sent to an analog-to-digital converter (ADC) 190.

The bottom antenna's analog receiver component 146 includes a T/R switch (limiter) 200 that receives the signal received by the bottom antenna 162, via the circulator 152 and BPF 168. The output of the T/R switch (limiter) 200 is received by a first LNA 202, which produces an amplified signal that is sent to a demultiplexer/splitter 204. Diplexer/splitter 204 splits the amplified signal received from the first LNA 202 into a low band (RF 962 to 1100 MHz) and a high band (RF 1101 to 1213 MHz). The low band RF is sent to a first image-filtering and second LNA component 206, which generates a signal that is combined with an LO signal 210 at a mixer 208. The output of the mixer 208 is sent to a BPF 214 and then to an amplifier 216, thus producing an IF signal with a bandwidth of 165 to 303 MHz. The output of the amplifier 216 is sent to an ADC 218.

The high band RF outputted from the diplexer/splitter 204 is sent to an image-filtering and LNA 222, which outputs a signal to a mixer 224, which is combined with an LO signal 226. The output of the mixer 224 is filtered by a BPF 230, then amplified by an amplifier 232 to produce an IF with a bandwidth of 176 to 288 MHz. The output of the amplifier 232 is sent to an ADC 234.

The outputs of the ADCs 190, 218, and 234 are sent to the DDCs 300, as shown in FIGS. 4-1 and 4-2. The low band digital signals produced by the ADCs 190 and 218 are sent to two TCAS DDCs 310, two transponder (XPDR) DDCs 320, and two UAT DDCs 330. FIG. 4-1 shows only one each of the TCAS, transponder, and UAT DDCs. The high and low band outputs from the ADCs 234 and 218 are sent to a DME DDC 340.

The TCAS DDC 310 receives the output of one of the ADCs 190, 218 at two mixers. The first mixer mixes the received digital IF signal with a zero-phase complex LO signal and the second mixer combines the received digital IF signal with a 90° phase-shifted complex LO signal. The complex LO produces two outputs at the same frequency and amplitude with 90° phase difference between them (i.e., in-phase (I) and quadrature (Q) representing real and imaginary components). The frequency value for the complex LO of the TCAS DDC is 175 MHz. Next, the outputs of the mixers are sent to respective CIC-decimating LPFs, which is a Cascade Integrator Comb filter which is a decimating filter structure with decimation factor R, M# of differential stages, and N# of stages. Decimation reduces the input rate by the decimation factor. If the input is clocked at $F_s$=320 Mhz and R=4 then the output is clocked at $F_{S2}$=80 Mhz. The output of the CIC-decimating LPFs are sent to respective Finite Impulse Response filter (FIR)-decimating LPFs with cutoff frequency $F_C$ input clock frequency $F_{S2}$. Next, a component receives the outputs of the FIR-decimating LPFs to determine a magnitude and phase value.

The components of the transponder DDC 320 are identical to those of the TCAS DDC 310, except that the complex LO operates at a frequency of 235 MHz. The data buffer, up and down samplers and interpolating FIR provide a resampler circuit for changing the output data rate to match the decoder's input data rate requirements. A delay/multiplier exists after the phase output to demodulate the DPSK (Differential Phase Shift Keying) data.

The UAT DDC 330 includes all the components of the other DDCs 310, 320, except that it does not include the component for generating the magnitude and phase of the signals produced by the FIR-decimating LPFs. Also, the UAT DDC 330 includes a complex LO that operates at 287 MHz and a variety of other components configured to produce an in-phase signal (I) and a quadrature phase signal (Q). The data buffers, up and down samplers and interpolating FIRs provide resampler circuits for changing the output data rate to match the decoder's input data rate requirements.

The high and low band AGC (automatic gain control) circuits control the gain of external variable gain amplifiers driving the ADC inputs. This ensures that the inputs to the ADC do not exceed their maximum linear range.

The DME DDC includes similar circuit components as that of the TCAS DDC 310, except that the frequency of the complex LO is 155 to 303 MHz.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method comprising:
   at a first receiver connected to a first antenna,
      receiving a signal from the first antenna;
      filtering the received signal based on bandwidths associated with a traffic collision-avoidance system (TCAS), a transponder, and a universal access transceiver (UAT);
      digitizing the filtered signal using a first analog-to-digital converter (ADC); and
      digitally downconverting the digitized signal into first TCAS signals, transponder signals, and UAT signals; and
   at a second receiver connected to a second antenna,
      receiving a signal from the second antenna;
      separating the received signal based on bandwidths associated with the TCAS, the transponder, the UAT, and distance measuring equipment (DME) (the DME bandwidth consisting of an upper half of a DME RF band and a lower half of the DME RF band) into a first signal having a bandwidth associated with the TCAS, the transponder, the UAT and the lower half of the DME RF band to produce a signal comprising a TCAS signal, a transponder signal, a UAT signal, and a lower half DME signal, and into a second signal having a bandwidth associated with the upper half of the DME RF band, the second signal comprising an upper half DME signal;
      digitizing the first and second signals using second and third ADCs, respectively; and
      digitally downconverting the digitized first and second signals into second TCAS signals, transponder signals, UAT signals, and upper and lower half DME signals.

2. The method of claim 1, wherein the first antenna is located on top of an aircraft fuselage and the second antenna is located on bottom of the aircraft fuselage.

3. The method of claim 1, further comprising:
   at the second receiver,
      filtering the first signal based on the bandwidth associated with the TCAS, the transponder, the UAT and the lower half of the DME RF band; and
      filtering the second signal based on the bandwidth associated with the upper half of the DME RF band.

4. The method of claim 3, wherein filtering comprises:
   heterodyning the signals using predefined local oscillator signals configured to produce signals having harmonics outside bands of the ADCs.

5. A system comprising:
   a first antenna;
   a second antenna;
   a first receiver connected to the first antenna, the first receiver configured to:
      receive a signal from the first antenna;
      filter the received signal based on bandwidths associated with a traffic collision-avoidance system (TCAS), a transponder, and a universal access transceiver (UAT);
      digitize the filtered signal; and
      digitally downconvert the digitized signal into first TCAS signals, transponder signals, and UAT signals; and
   a second receiver connected to the second antenna, the second receiver configured to:
      receive a signal from the second antenna;
      filter the signal received from the second antenna based on bandwidths associated with the TCAS, the transponder, the UAT, and the distance-measuring equipment (DME);
      separate the filtered signal based on bandwidths associated with the TCAS, the transponder, the UAT, and distance measuring equipment (DME) (the DME bandwidth consisting of an upper half of a DME RF band and a lower half of the DME RF band) into a first signal having a bandwidth associated with the TCAS, the transponder, the UAT and the lower half of a DME RF band to produce a signal comprising a TCAS signal, a transponder signal, a UAT signal, and a lower half DME signal, and into a second signal having a bandwidth associated with the upper half of the DME RF band, the second signal comprising an upper half DME signal; and
      digitally downconvert the digitized first and second signals into second TCAS signals, transponder signals, UAT signals, and upper and lower half DME signals.

6. The system of claim 5, wherein the first antenna is located on top of an aircraft fuselage and the second antenna is located on bottom of the aircraft fuselage.

7. The system of claim 5, wherein the second receiver is configured to:
   filter the first signal based on the bandwidth associated with the TCAS, the transponder, the UAT and the lower half of the DME RF band; and
   filter the second signal based on the bandwidth associated with the upper half of the DME RF band.

8. The system of claim 7, wherein the first receiver comprises an analog-to-digital converter (ADC) for performing the digitizing, wherein the first receiver heterodynes the received signal using predefined local oscillator signals configured to produce a signal having harmonics outside a band of the ADCs.

9. The system of claim 7, wherein the second receiver comprises first and second ADCs for performing the digitizing, wherein the second receiver heterodynes the received first and second signals using predefined local oscillator signals configured to produce signals having harmonics outside bands of the first and second ADCs.

* * * * *